H. M. KAMMERHOFF.
ELECTRICALLY OPERATED SPEED LIMITING DEVICE FOR MOTOR VEHICLES.
APPLICATION FILED APR. 17, 1916.

1,248,130.

Patented Nov. 27, 1917.

WITNESSES:
Edw. Thorpe
C. Bradway

INVENTOR
H. M. Kammerhoff
BY
ATTORNEY

UNITED STATES PATENT OFFICE.

HEINRICH M. KAMMERHOFF, OF ORANGE, NEW JERSEY.

ELECTRICALLY-OPERATED SPEED-LIMITING DEVICE FOR MOTOR-VEHICLES.

1,248,130.      Specification of Letters Patent.      Patented Nov. 27, 1917.

Application filed April 17, 1916. Serial No. 91,645.

*To all whom it may concern:*

Be it known that I, HEINRICH M. KAMMERHOFF, a subject of the Emperor of Germany, and a resident of Orange, in the county of Essex and State of New Jersey, have invented a new and Improved Electrically-Operated Speed-Limiting Device for Motor-Vehicles, of which the following is a full, clear, and exact description.

This invention relates to speed regulating devices for motor cars and has for its general objects to provide an electrically operated speed limiting device which can be adjusted for various speed limits so that if the car attains a speed in excess of a predetermined limit the supply of mixture to the motor is automatically cut down so as to decrease the speed of the car.

A more specific object of the invention is to improve and simplify the construction and operation of speed limiting devices so as to be reliable and efficient in use, comparatively simple and inexpensive to manufacture, install and keep in repair, and so designed that it is impossible to exceed a predetermined speed limit.

A more specific object of the invention is the provision of a dynamo which rotates at a speed which is variable with the speed of travel of the car, and consequently there is a variable pressure which, upon attaining a certain value, operates electrical means that directly or indirectly acts on a throttle or equivalent valve for controlling the volume of mixture supplied to the propelling motor, whereby the speed will be prevented from exceeding a certain point.

Still another object of the invention is the provision of means for adjusting the resistance of the circuit so that the limiting device becomes operative at any desired speed of the vehicle.

An additional object of the invention is the employment of a visual or audible signal, or both, which is energized just prior to the reaching of the speed limit, so that the driver can reduce the speed of the car before the electrical mixture controlling valve is closed to reduce the speed of or stop the car.

With such objects in view, and others which will appear as the description proceeds, the invention comprises various novel features of construction and arrangement of parts which will be set forth with particularity in the following description and claims appended hereto.

Figure 1:
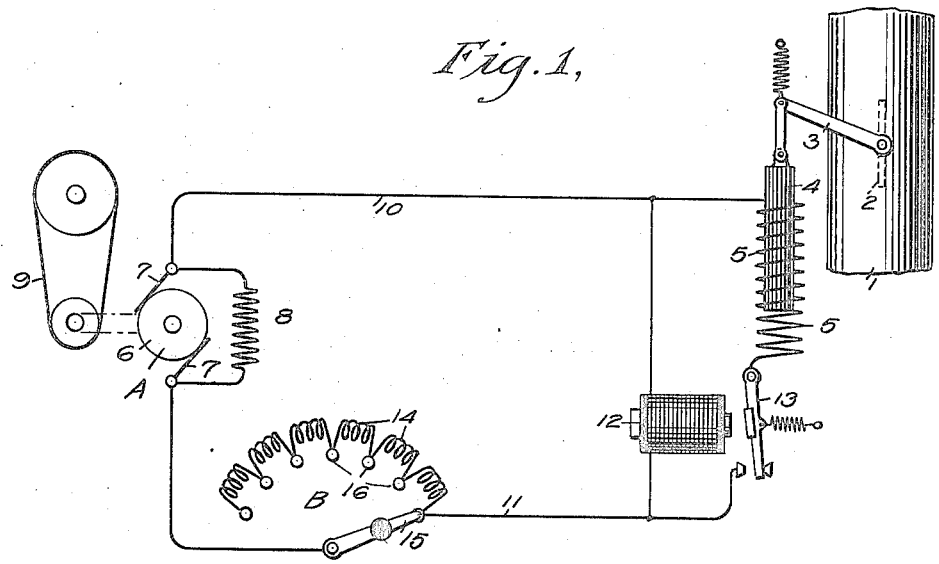
Figure 2:
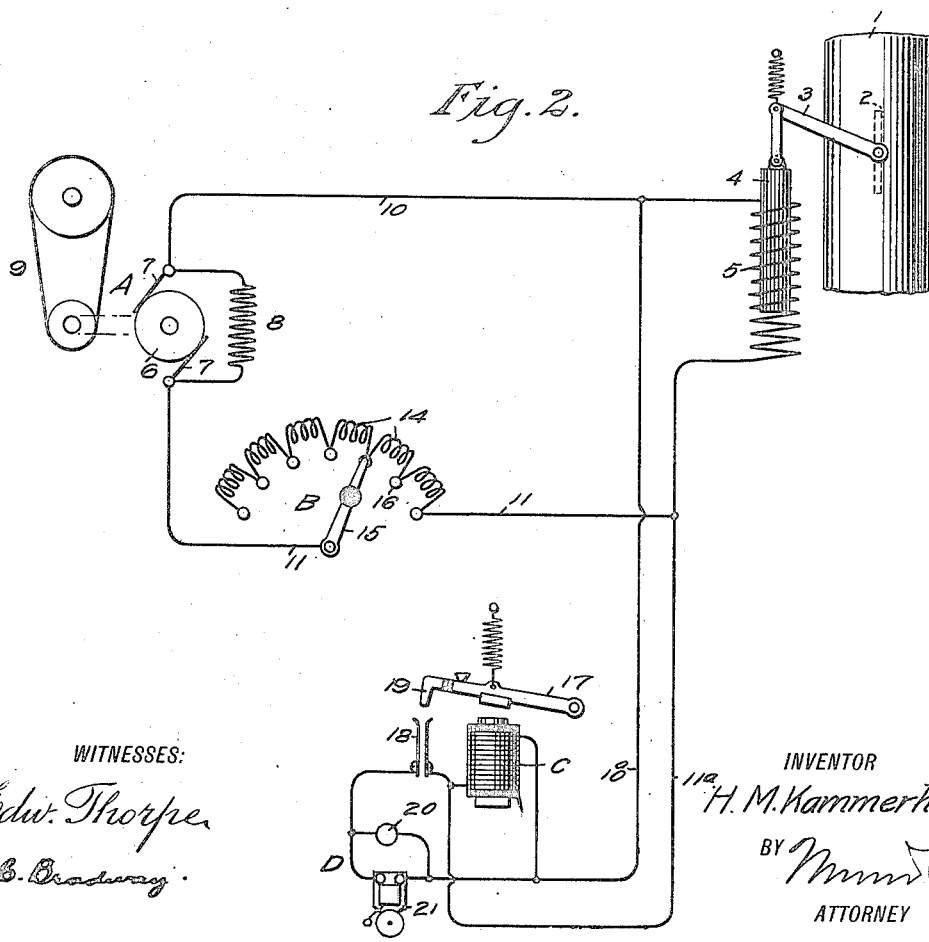

In the accompanying drawing, which illustrates certain embodiments of the invention and wherein similar characters of reference indicate corresponding parts in both the views, Figure 1 is a diagrammatic view of a simple form of electrical apparatus for controlling the mixture valve; and Fig. 2 is a diagrammatic view of a modified form of the invention.

Referring to the drawing, 1 designates a conduit for supplying mixture to the explosive engine of a motor car, and mounted therein is a butterfly valve 2 which is normally open and adapted to close only when the car attains a predetermined speed. A valve of any other type may of course be used. As shown, the valve has an arm 3 which is adapted to be electrically operated by suitable means, such as a core 4 of a solenoid 5 which becomes energized when the speed of the car reaches a predetermined limit.

In the present instance the system embodies an electric generator A that includes an armature 6 having commutator brushes 7 that are connected with a shunt field 8. The armature is connected by any suitable power transmitting mechanism 9 or with some part of the driving mechanism of the motor car or with a wheel or axle thereof, so that the speed of the motor will vary directly as the speed of the vehicle varies, whereby a current of varying pressure is produced.

The generator A may be connected in a closed circuit with the solenoid 5, as shown in Fig. 2, or in an open circuit, as shown in Fig. 1, and in the latter case the wires 10 and 11 leading from the generator are connected with an electro-magnet 12 which, when energized by current of a predetermined value, will close a switch 13, whereby current will flow through the solenoid 5 and operate the valve 2 for the purpose of lowering the speed of the car. This switch 13 and winding 5 may be connected with the wires 10 and 11, as shown in Fig. 1, or they may be in a local circuit containing a source of current. The wire 11 includes a rheostat B, the resistance coils 14 of which are adapted to be cut into or out of circuit by a movable contact arm 15. When the contact arm 15 is in the position shown in Fig. 1 the system will be set for the lowest possible speed limit, and when the speed of the car reaches such limit the electro-magnet 12 will be energized to close the switch 13, which in turn causes the solenoid 5 to become operative for closing the valve 2. If the speed at which the valve is to operate is desired to be increased, the arm 15 is moved in an anti-clockwise direction, so as to cut in one or more of the resistance coils 14, whereby a greater pressure will have to be produced by the generator A for causing the electro-magnet 12 to be energized and close the solenoid switch 13. This increase in pressure of the generator is created by the higher speed of rotation of the armature. The resistance coils of the rheostats can be so proportioned and the contact points 16 so arranged that the system can be adjusted to be operative for speed limits of ten, fifteen, twenty, twenty-five and thirty miles an hour, according to the speed regulations of the various municipalities, townships, etc., through which a route may lie.

In order to prevent the car from being automatically stopped or slowed down by the speed limiting device, it may be advisable to provide visual or audible signal devices which automatically become active just prior to the attaining of the speed limit, so that the driver can intentionally slow down the car without the speed limiting device coming into play. For this purpose an electrical means, such as an electromagnet C, Fig. 2, may be employed, the winding of which is connected by wires 10ª and 11ª in parallel with the solenoid winding 5. The armature 17 of this electromagnet C is adapted to close a circuit D by means of the contacts 18 and 19, and in this circuit may be arranged in parallelism a lamp 20 and a bell 21, which are both energized by current which is strong enough to operate the electromagnet C, but slightly lower than the current strength required to energize the solenoid 5. By means of these signal devices the driver is warned of the high speed at which he is driving the car, and he can control the throttle or spark in such a way as to lower the speed so that the solenoid will not be brought into action to close the throttle valve 2 and greatly reduce the speed of or stop the car.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. An electrically operated speed limiting device for motor vehicles, comprising an explosive mixture supply pipe, a valve therein, electrical means for closing the valve, a dynamo varying in speed directly as the speed of the vehicle varies, for supplying current to said electrical means for energizing the same when a predetermined speed limit is reached, and means for adjusting the resistance of the circuit through which the current flows for causing said electrical means to operate at any desired speed.

2. An electrically operated speed limiting device for motor vehicles, comprising an explosive mixture supply pipe, a valve therein, electrical means for closing the valve, a dynamo varying in speed directly as the speed of the vehicle varies, for supplying current to said electrical means for energizing the same when a predetermined speed limit is reached, a second electrical means connected with the dynamo and of slightly less resistance than the first electrical means for energization prior to the latter, and a signal circuit controlled by the said second means for warning the operator of the vehicle of the approach of a speed limit.

3. An electrically operated speed limiting device for motor vehicles, comprising an explosive mixture supply pipe, a valve therein, electrical means for closing the valve, a dynamo varying in speed directly as the speed of the vehicle varies, for supplying current to said electrical means for energizing the same when a predetermined speed limit is reached, a second electrical means connected with the dynamo and of slightly less resistance than the first electrical means for energization prior to the latter, a signal circuit controlled by the said second means for warning the operator of the vehicle of the approach of a speed limit, and means for varying the resistance of the circuit through which the current flows, to permit the electrical means to operate at any desired speed limit.

In testimony whereof I have signed my name to this specification in the presence of two subscribing witnesses.

HEINRICH M. KAMMERHOFF.

Witnesses:
C. BRADWAY,
PHILIP D. ROLLHAUS.